(12) United States Patent
Yamaguchi et al.

(10) Patent No.: US 8,446,646 B2
(45) Date of Patent: May 21, 2013

(54) LIGHT GUIDE AND IMAGE READING APPARATUS

(75) Inventors: Yoshiro Yamaguchi, Kanagawa (JP); Hirokazu Ichikawa, Kanagawa (JP); Akihiko Naya, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 169 days.

(21) Appl. No.: 13/020,440

(22) Filed: Feb. 3, 2011

(65) Prior Publication Data

US 2012/0019877 A1  Jan. 26, 2012

(30) Foreign Application Priority Data

Jul. 21, 2010  (JP) .................................. 2010-164165

(51) Int. Cl.
*H04N 1/04* (2006.01)

(52) U.S. Cl.
USPC ............................ 358/474; 358/471; 358/475

(58) Field of Classification Search
USPC .......................................... 358/474, 471, 475
See application file for complete search history.

(56) References Cited

U.S. PATENT DOCUMENTS

| | | | | |
|---|---|---|---|---|
| 5,499,112 A | * | 3/1996 | Kawai et al. | 358/475 |
| 6,072,171 A | * | 6/2000 | Nakamura et al. | 250/216 |
| 7,136,203 B2 | * | 11/2006 | Yokota et al. | 358/484 |

FOREIGN PATENT DOCUMENTS

| JP | A-2001-209138 | 8/2001 |
|---|---|---|
| JP | B2-3334833 | 8/2002 |
| JP | A-2006-60528 | 3/2006 |
| JP | A-2010-68411 | 3/2010 |

* cited by examiner

*Primary Examiner* — King Poon
*Assistant Examiner* — Andrew H Lam
(74) *Attorney, Agent, or Firm* — Oliff & Berridge, PLC (57) ABSTRACT

A light guide includes: a body which is a light-transmitting member and has light incidence surfaces as two end surfaces in a longitudinal direction and a light output surface which is one of side surfaces extending in the longitudinal direction; and light absorbing members which are provided on the light output surface or at least one, adjacent to the light output surface, of the side surfaces of the body and have a function of absorbing light that shines on the body from outside the body.

10 Claims, 6 Drawing Sheets

FIG. 1

(FIRST EXEMPLARY EMBODIMENT)

FIG. 2
(FIRST EXEMPLARY EMBODIMENT)

(FIRST EXEMPLARY EMBODIMENT)

FIG. 3C (SECOND EXEMPLARY EMBODIMENT)

FIG. 4C (THIRD EXEMPLARY EMBODIMENT)

FIG. 5C (FOURTH EXEMPLARY EMBODIMENT)

LIGHT GUIDE AND IMAGE READING APPARATUS

CROSS-REFERENCE TO RELATED APPLICATIONS

This application is based on and claims priority under 35 USC 119 from Japanese Patent Application No. 2010-164165 filed on Jul. 21, 2010.

BACKGROUND

1. Technical Field

The present invention relates to a light guide and an image reading apparatus.

2. Related Art

Among conventional image reading apparatus which illuminate a document with light and read an image of the document using reflection light is one that is configured so as to suppress a phenomenon (flare phenomenon) that reflection light from a portion other than a reading position of a document is reflected by a peripheral member or the like, shines on photodetecting elements of a line sensor such as a CCD (charge-coupled device), and is read as document information.

SUMMARY

According to an aspect of the invention, there is provided a light guide including: a body which is a light-transmitting member and has light incidence surfaces as two end surfaces in a longitudinal direction and a light output surface which is one of side surfaces extending in the longitudinal direction; and light absorbing members which are provided on the light output surface or at least one, adjacent to the light output surface, of the side surfaces of the body and have a function of absorbing light that shines on the body from outside the body.

BRIEF DESCRIPTION OF THE DRAWINGS

Exemplary embodiments of the present invention will be described in detail based on the following figures, wherein.

DESCRIPTION OF SYMBOLS

1 . . . Main body; 2 . . . Lid unit; 8a . . . Illumination light; 8b . . . Reflection light; 9 . . . Document; 9a . . . Surface; 10 . . . Image reading unit; 11 . . . Document stage; 12 . . . Light source; 12R . . . Red LED; 12G . . . Green LED; 12B . . . . Blue LED; Light guide; 13a . . . Light output surface; 13b . . . . First slant surface; 13c . . . Second slant surface; 13d . . . First lateral surface; 13e . . . Second lateral surface; 13f . . . Bottom surface; 13g . . . First light incidence surface; 13h . . . Second light incidence surface; 14 . . . Image forming lens; 15 . . . Reading devices; 20 . . . Document conveying mechanism; 21 . . . Sheet supply tray; 22 . . . Document separation roll; 23 . . . Document conveying rolls; 24 . . . Reading roll; 25 . . . Ejection rolls; 26 . . . Ejected sheet tray; 30 . . . Controller; 31 . . . Reading control section; 32 . . . Operating panel; 40 . . . First reflection/absorption members; 100 . . . Image reading apparatus; 111 . . . White reference member; 130 . . . Body; 311 . . . Lighting control section; 312 . . . Drive control section; 313 . . . A/D converting section; 314 . . . Image processing section; 315 . . . Transmission section; 411 . . . Second reflection/absorption member; 412 . . . Third reflection/absorption member; 413 . . . Fourth reflection/absorption member; 414 . . . Fifth reflection/absorption member; 415 . . . Sixth reflection/absorption member; 40a, 411a, 412a, 413a, 414a, 415a . . . Light reflection surface; 40b, 411b, 412b, 413b, 414b, 415b . . . Light absorption surface.

DETAILED DESCRIPTION

First Exemplary Embodiment

Figure 1:
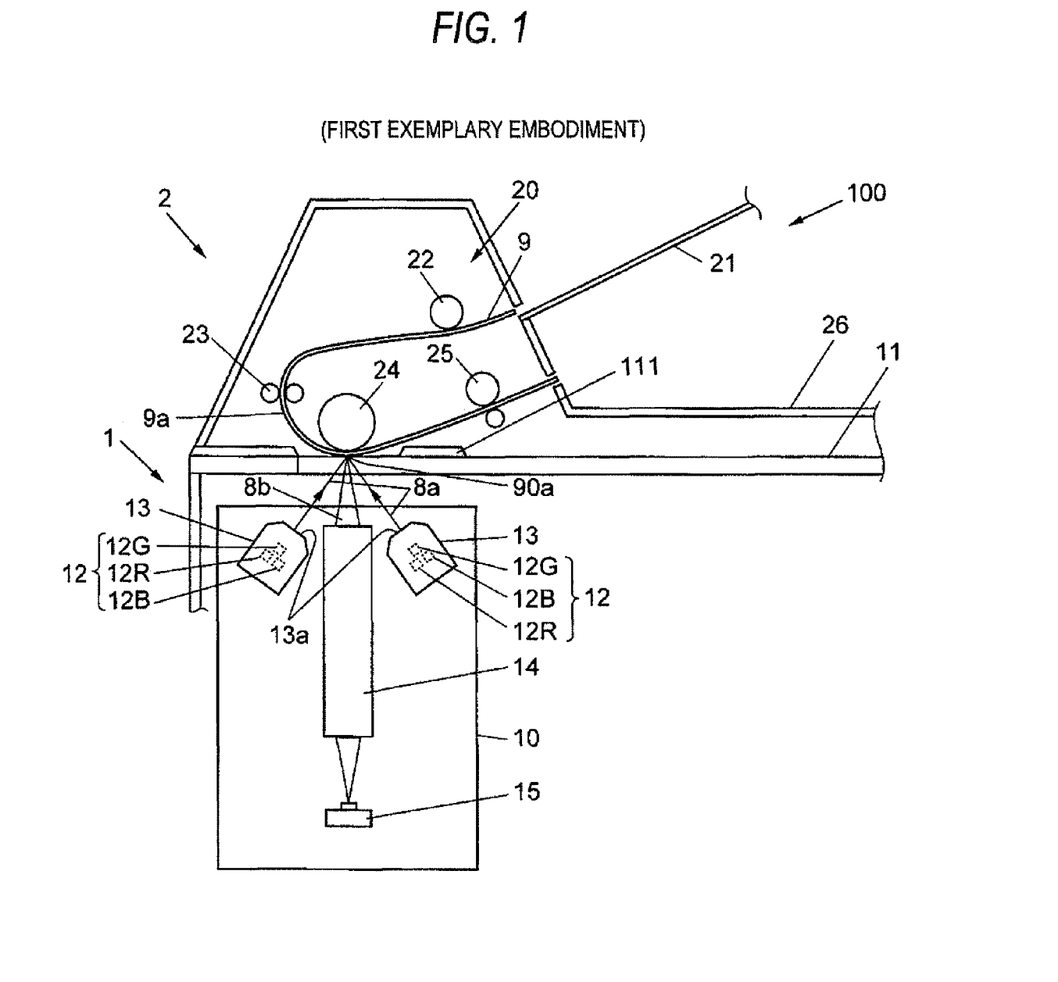
FIG. 1 is a schematic view showing an example configuration of an image reading apparatus according to a first exemplary embodiment of the present invention.

FIG. 1 is a schematic view showing an example configuration of an image reading apparatus according to a first exemplary embodiment of the present invention. The image reading apparatus 100 is incorporated in an image forming apparatus such as a copier. The image reading apparatus 100 has a main body 1 and a lid unit 2 which can be opened and closed with respect to the main body 1. The image reading apparatus 100 is thus configured so as to read an image of a surface 9a of a document 9.

The main body 1 is equipped with a document stage 11 which is a transparent body made of glass or the like, two pairs of light sources 12, a pair of light guides 13 for guiding light beams emitted from the two respective pairs of light sources 12 to a main scanning position, an image forming lens 14, and reading devices 15. The light sources 12, the light guides 13, the image forming lens 14, and the reading devices 15 constitute an image reading unit 10. A white reference member 111 for shading correction is provided on the lid-unit-2-side surface of the document stage 11.

Each light source 12 is provided with a red LED 12R, a green LED 12G, and a blue LED 123. Two light sources 12 are opposed to two respective end surfaces, in the main scanning direction, of the associated one of the pair of light guides 13.

The pair of light guides 13 extend in the main scanning direction and are arranged parallel with each other. Each light guide 13 has a rod shape and is typically made of a PMMA (poly (methyl methacrylate)) resin or glass. Each light guide 13 has, as one side surface, a light output surface 13a which is opposed to a reading position 90a which is located between a reading roll 24 and the document stage 11. The structure of each light guide 13 will be described later in detail.

The image forming lens 14, which is a rod lens array consisting of, for example, plural SELFOC lenses (registered trademark) that are arranged in the main scanning direction, is disposed between the document 9 and the reading devices 15. The image forming lens 14 is configured so as to receive reflection light 8b, reflected by the surface 9a of the document 9, of illumination light beams 8a that are applied to the document 9 from the light sources 12 via the light guides 13.

The reading devices 15, which are CCD (charge-coupled device) image sensors, for example, output electrical signals corresponding to the intensity of reflection light 8b that is image-formed on the reading devices 15. Alternatively, the reading devices 15 may be CMOS (complementary metal oxide semiconductor) image sensors or the like. The plural reading devices 15 are arranged in the main scanning direction so as to correspond to respective reading positions for the document 9.

The lid unit 2 is equipped with a sheet supply tray 21, a document separation roll 22, document conveying rolls 23, the reading roll 24, ejection rolls 25, and an ejected sheet tray 26, and is disposed over the main body 1.

The document separation roll 22, the document conveying rolls 23, the reading roll 24, and the ejection rolls 25 constitute a document conveying mechanism 20 for conveying the document 9 from the sheet supply tray 21 to the ejected sheet tray 26 via the document reading position 90a.

Figure 2:
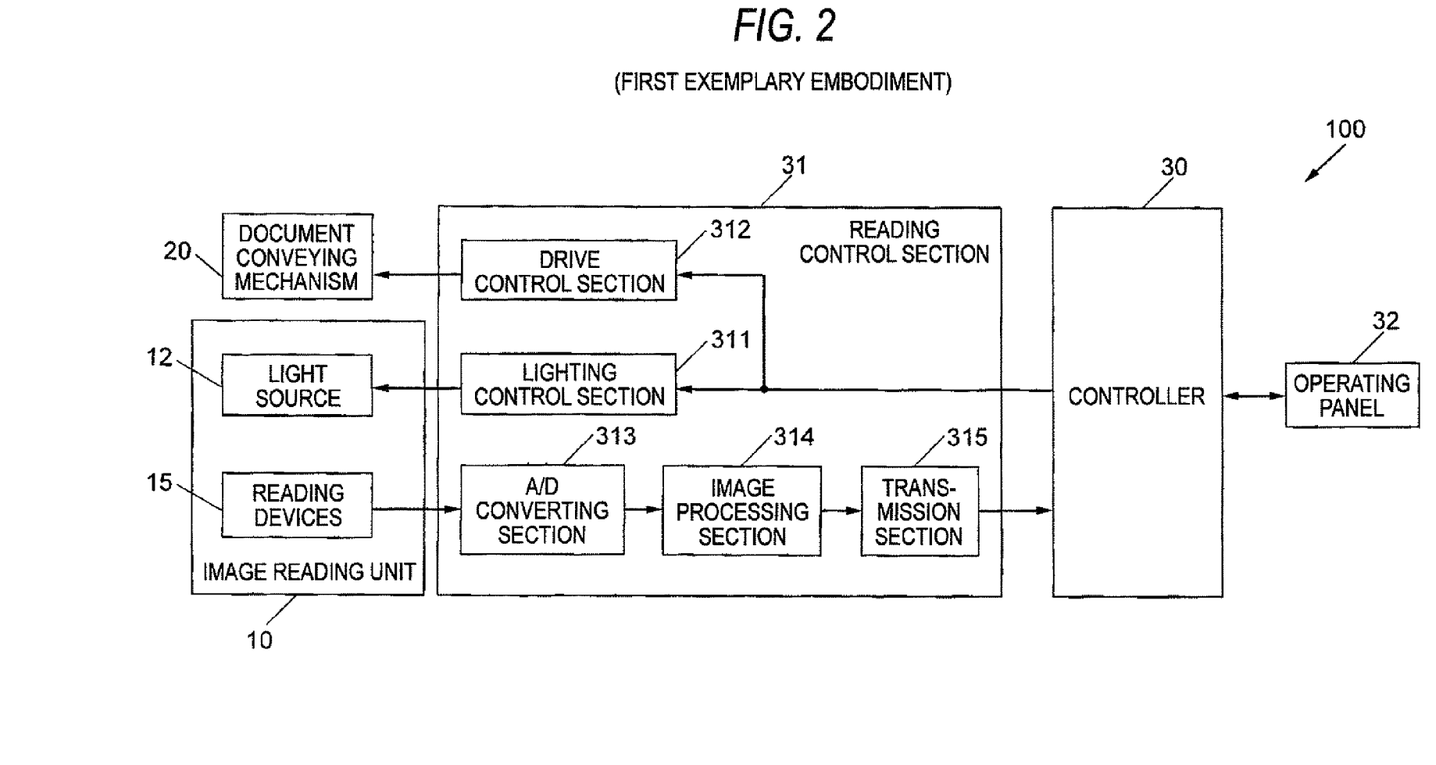
FIG. 2 is a block diagram showing an example entire configuration of the image reading apparatus according to the first exemplary embodiment of the invention.

FIG. 2 is a block diagram showing the entire configuration of the image reading apparatus 100. The image reading apparatus 100 is equipped with a controller 30 for controlling the entire image reading apparatus 100, a reading control section 31 for controlling image reading from the document 9, and an operating panel 32 to be manipulated by the user to input an operation instruction, various settings, etc.

The reading control section 31 has a lighting control section 311 for controlling the lighting of the red LED 12R, the green LED 12G, and the blue LED 12B which constitute each light source 12, a drive control section 312 for driving the rolls 22 to 25 which constitute the document conveying mechanism 20, an A/D converting section 313 for converting output electrical signals of the reading devices 15 into digital signals, an image processing section 314 for generating image information on the basis of the digital signals generated by the A/D converting section 313, and a transmission section 315 for transmitting the image information to the controller 30.

The lighting control section 311 turns on the red LED 12R, the green LED 12G, and the blue LED 12B one by one in order by supplying current to the LED to be turned on.

When instructed to read the document 9 from user through the operating panel 32, the drive control section 312 rotates the document separation roll 22, the document conveying rolls 23, the reading roll 24, and the ejection rolls 25 by driving a motor (not shown). When plural documents 9 are placed on the sheet supply tray 21, the drive control section 312 rotates the rolls 22 to 25 until all the documents 9 are ejected to the ejected sheet tray 26.

The A/D converting section 313 converts analog signals that are output from the reading devices 15 and reflect the intensity of reflection light 8b into digital signals, and outputs the latter.

The image processing section 314 generates pieces of color image information representing image reading results of the document 9 on the basis of the output digital signals of the A/D converting section 313. More specifically, the image processing section 314 generates red image information according to the intensity of reflection light 8b when the red LED 12R emits light, generates green image information according to the intensity of reflection light 8b when the green LED 12G emits light, and generates blue image information according to the intensity of reflection light 8b when the blue LED 12B emits light.

The transmission section 315, which has a differential circuit etc. for data transmission, is configured so as to be able to transfer pieces of image information generated by the image processing section 314 to the controller 30.

The controller 30 causes an image forming unit of a copier, for example, to print a color image by outputting received pieces of image information to it, or outputs received pieces of image information to a computer, a storage medium, or the like that is connected to the image reading apparatus 100 by a communication line.

(Structure of Light Guides)

Figure 3A:
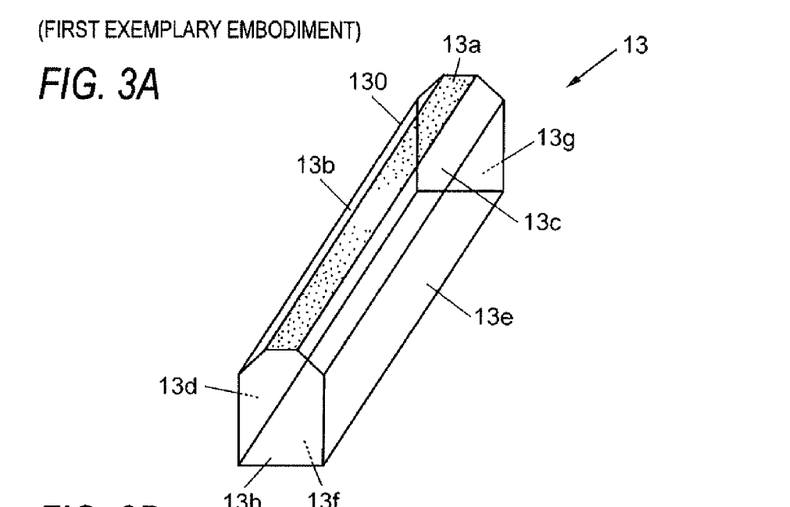
FIGS. 3A, 3B and 3C area perspective view, a plan view, and a partial sectional view, respectively, showing an example shape and structure of each light guide according to the first exemplary embodiment of the invention.
Figure 3B:
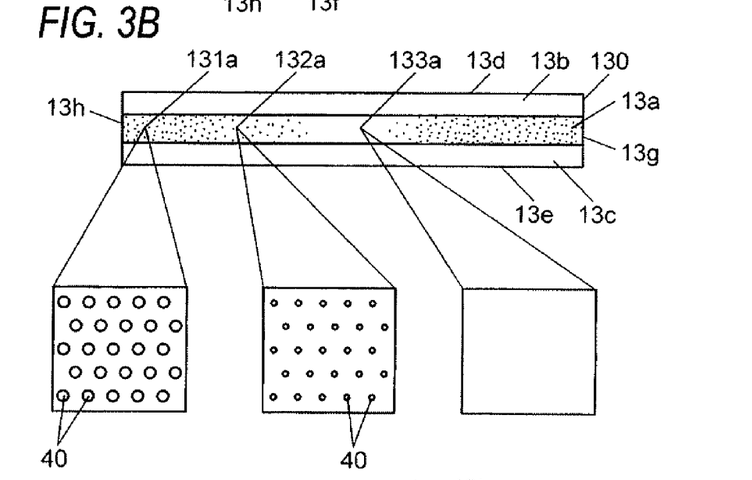
Figure 3C:
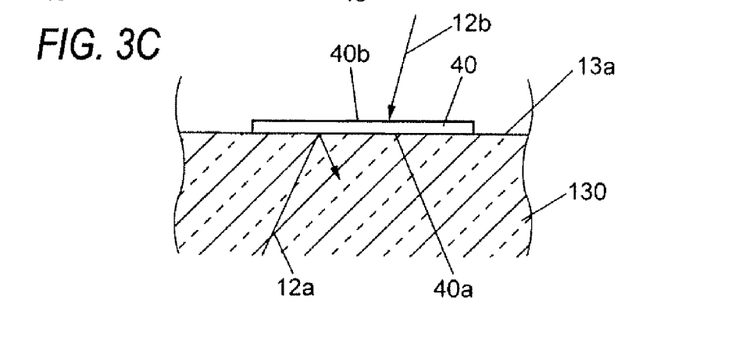

FIGS. 3A to 3C are a perspective view, a plan view, and a partial sectional view, respectively, showing an example structure of each light guide 13. In FIGS. 3A to 3C, for convenience of description, the light guide 13 is drawn in such a manner as to be reduced in the longitudinal direction.

As shown in FIGS. 3A to 3C, the light guide 13 has a body 130 which is a light-transmitting member and first reflection/absorption members 40 (example light absorbing members) which are formed on the light output surface 13a of the body 130.

The body 130 generally has a rectangular parallelepiped shape that is chamfered on both sides, in the width direction, of the light output surface 13a. One end surface, in the longitudinal direction, of the body 130 is a first light incidence surface 13g and the other surface, in the longitudinal direction, of the body 130 is a second light incidence surface 13h. The first light incidence surface 13g and the second light incidence surface 13h are disposed in the main body 1 of the image reading apparatus 100 so as to be opposed to the two respective light sources 12 so that light beams emitted from the two light sources 12 shine on the first light incidence surface 13g and the second light incidence surface 13h, respectively.

The side surfaces that are perpendicular to the first light incidence surface 13g and the second light incidence surface 13h and extend in the longitudinal direction of the body 130 are the light output surface 13a, a first slant surface 13b and a second slant surface 13c which are adjacent to the light output surface 13a, a first lateral surface 13d which is adjacent to the first slant surface 13b, a second lateral surface 13e which is adjacent to the first slant surface 13c, and a bottom surface 13f which is adjacent to the first lateral surface 13d and the second lateral surface 13e.

The light output surface 13a is a flat surface extending in the longitudinal direction and is parallel with and opposed to the bottom surface 13f. The first slant surface 13b extends in the longitudinal direction and is adjacent to the light output surface 13a. The second slant surface 13c, which is located on the other side, in the width direction, of the light output surface 13a from the first slant surface 13b, extends in the longitudinal direction and is adjacent to the light output surface 13a. The first slant surface 13b and the second slant surface 13c are inclined from the light output surface 13a in a cross section taken perpendicularly to the longitudinal direction of the body 130. In the cross section, the angle formed by the light output surface 13a and each of the first slant surface 13b and the second slant surface 13c is an obtuse angle which is in a range of 110° to 160°, for example.

As shown in FIGS. 3B and 3C, first reflection/absorption members 40 are formed on the light output surface 13a. More specifically, a large number of minute first reflection/absorption members 40 are formed on the light output surface 13a. Light exits through regions of the light output surface 13a where the first reflection/absorption members 90 are not formed.

In the exemplary embodiment, the first reflection/absorption members 90 are made of aluminum. However, the first reflection/absorption members 40 may be made of any of other metals such as chromium, zinc, and nickel. For example, the first reflection/absorption members 40 may be formed by depositing a metal film of aluminum on the light output surface 13a by evaporation using a mask.

The first reflection/absorption members 40 are formed in such a manner that the ratio of covering of the light output surface 13a decreases as the position goes in the longitudinal direction from the first light incidence surface 13g or the second light incidence surface 13h (end position) to the center.

More specifically, as shown in FIG. 3B, the first reflection/absorption members 40 (dots) formed by aluminum evaporation are large in a first region 131a that is close to each end position and is smaller in a second region 132a (that is closer to the center in the longitudinal direction than the first region 131a) than in the first region 131a. No first reflection/absorption members 40 are formed in a third region 133a (and its vicinity) that is located at the center in the longitudinal direction. Alternatively, the ratio of covering of the light output surface 13a by the first reflection/absorption members 40 may be decreased gradually by varying their density or their density and size. The shape of the first reflection/absorption members 40 is not limited to a dot and may be a line, for example.

As shown in FIG. 3C, each of the first reflection/absorption members 40 is formed on the light output surface 13a like a film. The surface, located on the side of the body 130, of each first reflection/absorption member 40 is a light reflection surface 40a which is a specular surface and is in close contact with the light output surface 13a. Because of the light reflection surface 40a, each first reflection/absorption member 40 has a function of reflecting, to inside the body 130, light traveling in such a direction as to exit the body 130.

The surface, opposite to the light reflection surface 40a, of each first reflection/absorption member 40 is a black light absorption surface 40b which has been blackened by aluminum oxidation. Because of the black light absorption surface 40b, each first reflection/absorption member 40 has a function of absorbing light shining on the body 130 from outside it.

The light reflection surface 40a reflects, to inside the body 130, light 12a that has entered the body 130 through the first light incidence surface 13g or the second light incidence surface 13h and travels in such a direction as to exit the body 130. Part of light reflected by the light reflection surface 40a is further reflected by the surfaces of the body 130 and exits the body 130 through a portion of the light output surface 13a where no first reflection/absorption member 40 is formed.

The light absorption surface 40b absorbs reflection light 12b that has been reflected by, for example, the surface 9a of the document 9 and shines on the light output surface 13a from outside the body 130.

Since light beams emitted from the two light sources 12 enter the body 130 through the first light incidence surface 13g and the second light incidence surface 13h which are located at both ends in the longitudinal direction, if the first reflection/absorption members 40 were not formed, the light quantity of each illumination light beam 8a (see FIG. 1) by which the document 9 is illuminated would be large in both end portions and low around the center in the main scanning direction. Since as shown in FIG. 3B the first reflection/absorption members 40 are relatively large in both end regions, the probability that light 12a is reflected by a light reflection surface 40a is high in both end portions in the main scanning direction, whereby the light quantity profile of each illumination light beam 8a in the longitudinal direction of the light guide 13 is made uniform.

If light that is reflected by the surface 9a of the document 9 is again reflected by one of the light output surfaces 13a, resulting light may shine on a reading device 15 after being reflected multiple times by constituent members of the main body 1 of the image reading apparatus 100. However, since reflection light 12b that is reflected by the surface 9a of the document 9a and other surfaces is absorbed by the light absorption surface 40b of a first reflection/absorption member 40, the total light quantity of light beams that shine on each set of reading devices 15 after multiple reflection is reduced.

Second Exemplary Embodiment

Figure 4A:
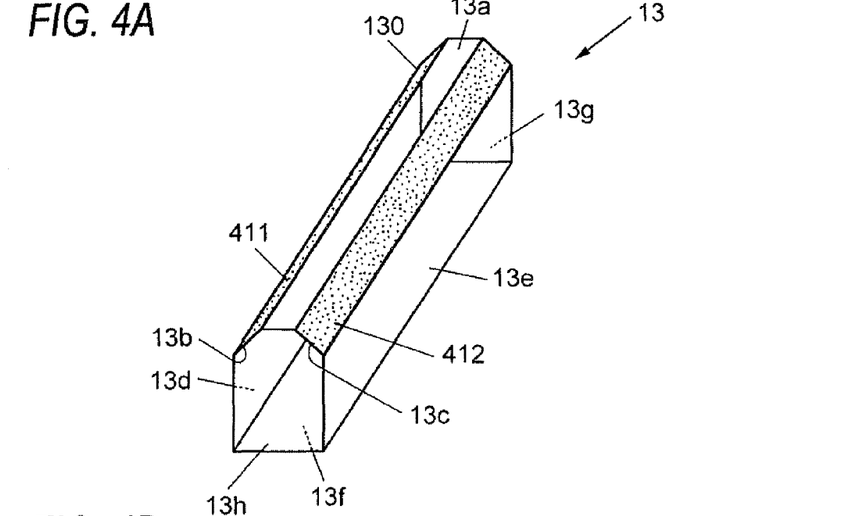
FIGS. 4A, 4B and 4C area perspective view, a plan view, and a sectional view, respectively, showing an example shape and structure of each light guide according to a second exemplary embodiment of the invention.
Figure 4B:
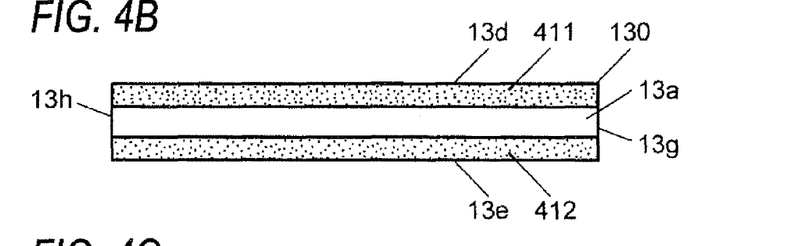
Figure 4C:
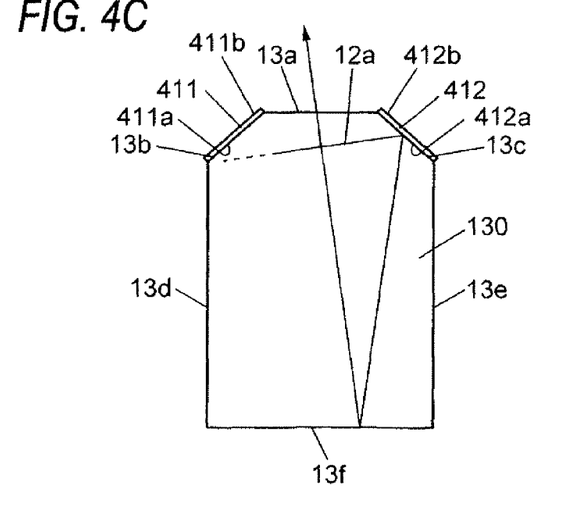

FIGS. 4A to 4C are a perspective view, a plan view, and a sectional view, respectively, showing an example structure of each light guide 13A according to a second exemplary embodiment of the invention.

Whereas the second exemplary embodiment is the same as the first exemplary embodiment in the shape of the body 130, the former is different from the latter in the positions of reflection/absorption members. Members of the light guide 13A having the same members in the first exemplary embodiment are given the same reference symbols as the latter and will not be described in detail.

As shown in FIGS. 4A and 4B, in the light guide 13A according to the second exemplary embodiment, a continuous second reflection/absorption member 411 is formed on the first slant surface 13b and a continuous third reflection/absorption member 412 is formed on the second slant surface 13c of the body 130. Although in the second exemplary embodiment the continuous second reflection/absorption member 411 is formed on the entire first slant surface 13b and the continuous third reflection/absorption member 412 is formed on the entire second slant surface 13c, discrete second reflection/absorption members 411 and discrete third reflection/absorption members 412 may be formed on the first slant surface 13b and the second slant surface 13c, respectively. No reflection/absorption members are formed on the light output surface 13a.

Like the first reflection/absorption members 40 used in the first exemplary embodiment, the second reflection/absorption member 411 and the third reflection/absorption member 412 (example light absorbing members) are formed by evaporating aluminum onto the first slant surface 13b and the second slant surface 13c of the body 130 and blackening the outside surfaces of aluminum films.

As shown in FIG. 4C, the surface, located on the side of the body 130, of the second reflection/absorption member 411 is a light reflection surface 411a which is a specular surface and its surface, opposite to the light reflection surface 411a, is a black light absorption surface 411b. Likewise, the surface, located on the side of the body 130, of the third reflection/absorption member 412 is a light reflection surface 412a which is a specular surface and its surface, opposite to the light reflection surface 412a, is a black light absorption surface 412b.

For example, as shown in FIG. 4C, light 12a that has entered the body 130 through the first light incidence surface 13g or the second light incidence surface 13h is reflected by the light reflection surface 412a of the third reflection/absorption member 412, is then reflected by the bottom surface 13f, and finally exits the body 130 through the light output surface 13a. As seen from this example, since the inside surfaces of the second reflection/absorption member 411 and the third reflection/absorption member 412 are the light reflection surfaces 411a and 412a, the amount of light that exits the body 130 through the light output surface 13a is made larger than in a case that light is absorbed by these surfaces.

The second reflection/absorption member 411 and the third reflection/absorption member 412 function as a stop for light to exit the light guide 13A, whereby the probability that light that has exited the light guide 13 hits the document 9 at the reading position 90a is increased.

If light that is reflected by the surface 9a of the document 9 is again reflected by the first slant surface 13b or the second slant surface 13c, resulting light may shine on a reading device 15 after being reflected multiple times by constituent members of the main body 1 of the image reading apparatus 100. However, since reflection light that is reflected by the surface 9a of the document 9 and other surfaces is absorbed by the light absorption surface 411b of a second reflection/absorption member 411 or the light absorption surface 412b of a third reflection/absorption member 412, the total light quantity of light beams that shine on each set of reading devices 15 after multiple reflection is reduced.

Third Exemplary Embodiment

Figure 5A:
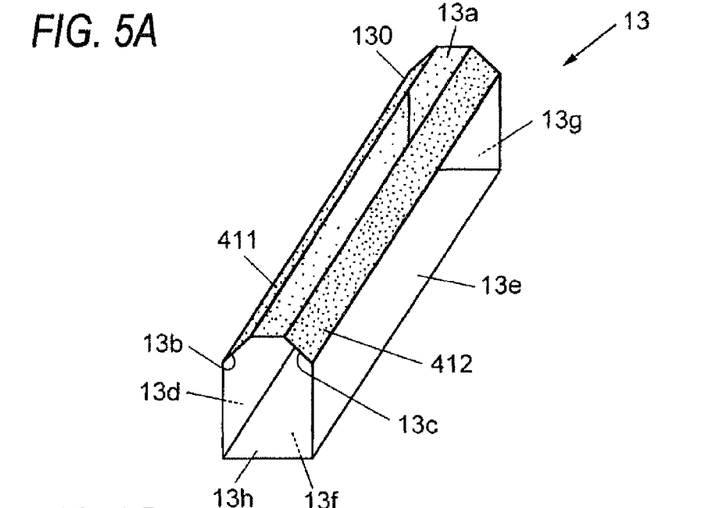
FIGS. 5A, 5B and 5C are a perspective view, a plan view, and a sectional view, respectively, showing an example shape and structure of each light guide according to a third exemplary embodiment of the invention.
Figure 5B:
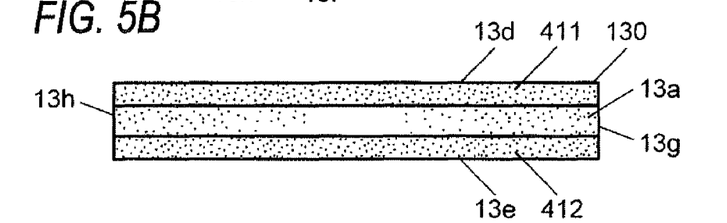
Figure 5C:
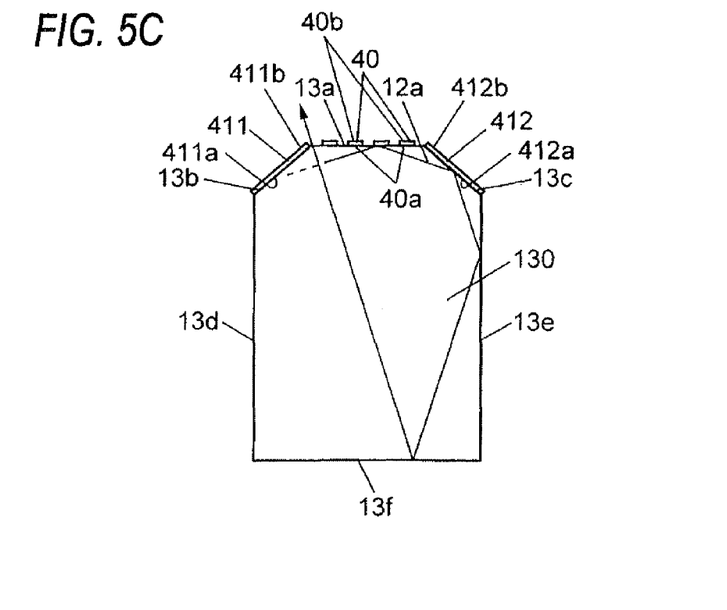

FIGS. 5A to 5C are a perspective view, a plan view, and a sectional view, respectively, showing an example structure of each light guide 13B according to a third exemplary embodiment of the invention.

Whereas the third exemplary embodiment is the same as the first and second exemplary embodiments in the shape of the body 130, the former is different from the latter in the positions of reflection/absorption members. Members of the light guide 13B having the same members in the first or second exemplary embodiment are given the same reference symbols as the latter and will not be described in detail.

The first reflection/absorption members 40 are formed on the light output surface 13a of the light guide 13B according to the third exemplary embodiment in such a manner that the ratio of covering of the light output surface 13a decreases as the position goes in the longitudinal direction from the first light incidence surface 13g or the second light incidence surface 13h (end position) to the center. The second reflection/absorption member 411 is formed on the first slant surface 13b and the third reflection/absorption member 412 is formed on the second slant surface 13c.

For example, as shown in FIG. 5C, light 12a that has entered the body 130 through the first light incidence surface 13g or the second light incidence surface 13h is reflected by the light reflection surface 40a of a first reflection/absorption member 40 and the light reflection surface 412a of the third reflection/absorption member 412, is then reflected by the second lateral surface 13e and the bottom surface 13f, and finally exits the body 130 through the light output surface 13a. The second reflection/absorption member 411 and the third reflection/absorption member 412 function as a stop for light to exit the light guide 13B, whereby the probability that light that has exited the light guide 13B hits the document 9 at the reading position 90a is increased.

If light that is reflected by the surface 9a of the document 9 is again reflected by the first slant surface 13b or the second slant surface 13c, resulting light may shine on a reading device 15 after being reflected multiple times by constituent members of the main body 1 of the image reading apparatus 100. However, since reflection light that is reflected by the surface 9a of the document 9 and other surfaces is absorbed by the light absorption surface 40b of a first reflection/absorption member 40, the light absorption surface 411b of a second reflection/absorption member 411 or the light absorption surface 412b of a third reflection/absorption member 412, the total light quantity of light beams that shine on each set of reading devices 15 after multiple reflection is reduced.

Fourth Exemplary Embodiment

Figure 6A:
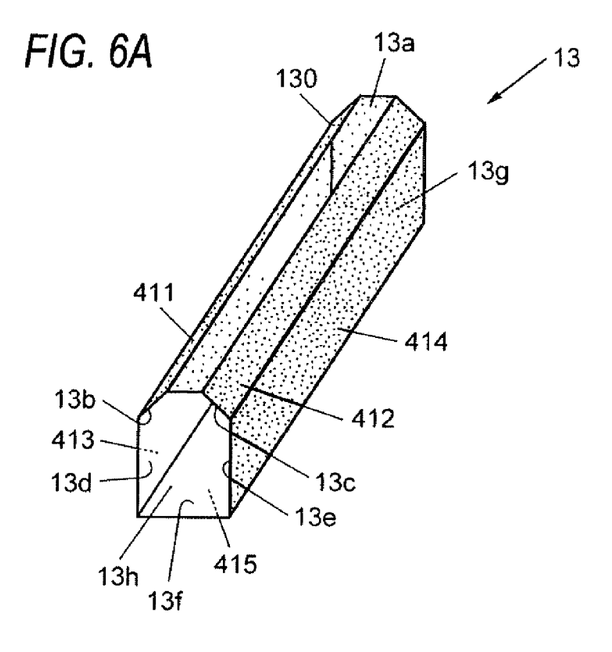
FIGS. 6A and 6B are a perspective view and a sectional view, respectively, showing an example shape and structure of each light guide according to a fourth exemplary embodiment of the invention.
Figure 6B:
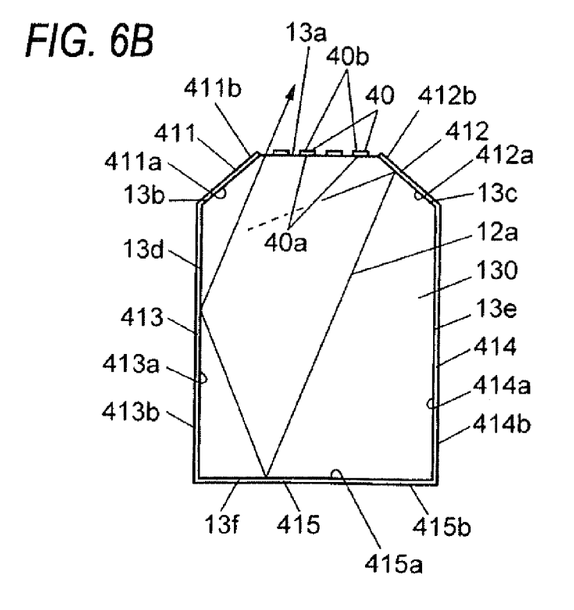

FIGS. 6A and 6B are a perspective view and a sectional view, respectively, showing an example structure of each light guide 13C according to a fourth exemplary embodiment of the invention.

Whereas the fourth exemplary embodiment is the same as the first to third exemplary embodiments in the shape of the body 130, the former is different from the latter in the positions of reflection/absorption members. Members of the light guide 13C having the same members in the first, second, or third exemplary embodiment are given the same reference symbols as the latter and will not be described in detail.

In the light guide 13C according to a fourth exemplary embodiment, a continuous fourth reflection/absorption member 413, a continuous fifth reflection/absorption member 414, and a continuous sixth reflection/absorption member 415 are provided in addition to the first reflection/absorption members 40, the second reflection/absorption member 411, and the third reflection/absorption member 412. The fourth reflection/absorption member 413, the fifth reflection/absorption member 414, and the sixth reflection/absorption member 415 are formed on the first lateral surface 13d, the second lateral surface 13e, and the bottom surface 13f, respectively.

Like the first reflection/absorption members 40 used in the first exemplary embodiment, the fourth reflection/absorption member 413, the fifth reflection/absorption member 414, and the sixth reflection/absorption member 415 (example light absorbing members) are formed by evaporating aluminum onto the surfaces 13d, 13e, and 13f and the second slant surface 13c of the body 130 and blackening the outside surfaces of aluminum films.

As shown in FIG. 6B, the surface, located on the side of the body 130, of the fourth reflection/absorption member 413 is a light reflection surface 413a which is a specular surface and its surface, opposite to the light reflection surface 413a, is a black light absorption surface 413b. Likewise, the surface, located on the side of the body 130, of the fifth reflection/absorption member 414 is a light reflection surface 414a which is a specular surface and its surface, opposite to the light reflection surface 414a, of is a black light absorption surface 414b. The surface, located on the side of the body 130, of the sixth reflection/absorption member 415 is a light reflection surface 415a which is a specular surface and its surface, opposite to the light reflection surface 415a, of is a black light absorption surface 415b.

Although in the fourth exemplary embodiment the continuous fourth reflection/absorption member 413, fifth reflection/absorption member 414, and sixth reflection/absorption member 415 are formed on the entire first lateral surface 13d, second lateral surface 13e, and bottom surface 13f, respectively, discrete fourth reflection/absorption members 413, fifth reflection/absorption members 414, and sixth reflection/absorption members 415 may be formed on the first lateral surface 13d, second lateral surface 13e, and bottom surface 13f, respectively.

For example, as shown in FIG. 60, light 12a that has entered the body 130 through the first light incidence surface 13g or the second light incidence surface 13h is reflected by the light reflection surface 40a of a first reflection/absorption member 40 and the light reflection surface 412a of the third reflection/absorption member 412, is then reflected by the light reflection surface 415a of the sixth reflection/absorption member 415 and the light reflection surface 413a of the fourth reflection/absorption member 413, and finally exits the body 130 through the light output surface 13a. The surfaces of the body 130 excluding the light output surface 13a are each formed with the reflection/absorption member over the entire area, whereby the amount of light that leaks through the surfaces other than the light output surface 13a is reduced.

Furthermore, since the fourth reflection/absorption member 413, the fifth reflection/absorption member 414, and the sixth reflection/absorption member 415, together with the first reflection/absorption members 40, the second reflection/absorption member 411, and the third reflection/absorption member 412, are formed on the side surfaces of the body 130 excluding the light output surface 13a, the amount of light that is reflected by the surfaces of the body 130 is reduced further.

Other Exemplary Embodiments

The invention is not limited to the above exemplary embodiments, and various modifications are possible without departing from the spirit and scope of the invention.

For example, although in each exemplary embodiment the reflection/absorption members are formed by aluminum evaporation, the invention is not limited to such a case. The reflection/absorption members may be formed by plating or the like. The material of the reflection/absorption members is not limited to metal. For example, a modification is possible in which a white resin is melted and applied to the body 130 of each light guide 13 and its outside surface is colored in black.

Although in each exemplary embodiment the body 130 of each light guide 13 has the two end surfaces in the longitudinal direction and the six flat side surfaces, the invention is not limited to such a case. For example, each light guide may have a rectangular parallelepiped shape or a cylindrical shape. Furthermore, a fixing portion to be used for fixing each light guide 13 to the image reading apparatus 100 may be integrated with the body 130.

A reflection/absorption member may be formed on each of the first light incidence surface 13g and the second light incidence surface 13h in such a region as not obstruct incidence of light from the associated light source 12.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A light guide comprising:
a body which is a light-transmitting member and has light incidence surfaces as two end surfaces in a longitudinal direction and a light output surface which is one of side surfaces extending in the longitudinal direction; and
light absorbing members which are provided on the light output surface or at least one, adjacent to the light output surface, of the side surfaces of the body and have a function of absorbing light that shines on the body from outside the body,
the light absorbing members further having a function of reflecting, to inside the body, light that travels in such a direction as to exit the body, and
the light absorbing members being formed on the light output surface discretely.

2. The light guide according to claim 1, wherein the light absorbing members are provided on the light output surface in such a manner that a ratio of covering of the light output surface decreases as the position goes from each of the light incidence surfaces to the center in the longitudinal direction.

3. The light guide according to claim 1, wherein: the body has slant surfaces each of which extends in the longitudinal direction, is adjacent to the light output surface, and forms an obtuse angle with the light output surface; and a continuous light absorbing member or discrete light absorbing members are formed on each of the slant surfaces.

4. The light guide according to claim 1, wherein the light absorbing members are provided on the side surfaces excluding the light output surface.

5. The light guide according to claim 1, wherein a body-side surface of each of the light absorbing members is a specular surface.

6. The light guide according to claim 1, wherein each of the light absorbing members is a metal film.

7. The light guide according to claim 5, wherein each of the light absorbing members is a metal film.

8. The light guide according to claim 1, wherein each of the light absorbing members is an evaporated aluminum film and a surface, opposite to the body, of the aluminum film is blackened.

9. The light guide according to claim 5, wherein each of the light absorbing members is an evaporated aluminum film and a surface, opposite to the body, of the aluminum film is blackened.

10. An image reading apparatus comprising:
light sources;
a light guide for guiding light beams emitted from the respective light sources to a main scanning position, comprising:
a body which is a light-transmitting member and has light incidence surfaces as two end surfaces in a longitudinal direction and a light output surface which is one of side surfaces extending in the longitudinal direction; and
light absorbing members which are provided on the light output surface or at least one, adjacent to the light output surface, of the side surfaces of the body and having a function of absorbing light that shines on the body from outside the body,
the light absorbing members further having a function of reflecting, to inside the body, light that travels in such a direction as to exit the body, and
the light absorbing members being formed on the light output surface discretely; and
an image information generating section for generating image formation according to intensity of light reflected from a document that is illuminated by light that is guided by the light guide.

* * * * *